United States Patent
Bauchot et al.

(10) Patent No.: US 8,176,433 B2
(45) Date of Patent: May 8, 2012

(54) APPLICATION WINDOW AREA CHANGE SURVEILLANCE

(75) Inventors: Frederic J. Bauchot, Saint-Jeannet (FR); Gerard Marmigere, Drap (FR); Joaquin Picon, St. Laurent du Var (FR); Xavier Rey-Robert, La Gaude (FR); Vincent Tassy, Cagnes sur Mer (FR)

(73) Assignee: International Business Machines Corporation, Armonk, NY (US)

(*) Notice: Subject to any disclaimer, the term of this patent is extended or adjusted under 35 U.S.C. 154(b) by 665 days.

(21) Appl. No.: 12/235,986

(22) Filed: Sep. 23, 2008

(65) Prior Publication Data

US 2010/0042945 A1 Feb. 18, 2010

(30) Foreign Application Priority Data

Aug. 18, 2008 (EP) .................................. 08305487

(51) Int. Cl.
*G06F 3/048* (2006.01)
(52) U.S. Cl. ................. 715/772; 715/762; 715/778
(58) Field of Classification Search .................. 715/764, 715/772; 709/224
See application file for complete search history.

(56) References Cited

U.S. PATENT DOCUMENTS

| 5,978,828 | A * | 11/1999 | Greer et al. ................... 709/224 |
| 6,229,542 | B1 * | 5/2001 | Miller ............................ 715/782 |
| 6,981,225 | B1 | 12/2005 | Gaudette |
| 7,844,902 | B2 * | 11/2010 | Cappels et al. ............... 715/719 |
| 2008/0172631 | A1* | 7/2008 | Oliver et al. .................. 715/771 |
| 2009/0064312 | A1* | 3/2009 | Furuichi et al. ................. 726/16 |
| 2009/0196296 | A1* | 8/2009 | Vachuska ................. 370/395.32 |
| 2009/0259966 | A1* | 10/2009 | Hara .............................. 715/796 |
| 2009/0292998 | A1* | 11/2009 | Kumar et al. ................. 715/738 |
| 2010/0031086 | A1* | 2/2010 | Leppard .......................... 714/15 |

OTHER PUBLICATIONS

Andy Flesner, AutoIt v3: Your Quick Guide, Sep. 2007, O'Reilly Short Cuts, pp. 1, 10, 23-27.*

* cited by examiner

*Primary Examiner* — Dennis-Doon Chow
*Assistant Examiner* — David Choi
(74) *Attorney, Agent, or Firm* — Scully, Scott, Murphy & Presser, P.C.; Douglas A. Lashmit, Esq.

(57) ABSTRACT

A method and system for monitoring a computer program window define an area of a computer program window and compute a hash value for the defined area. The computed hash value is stored and the hash value is recomputed for the defined area after a predetermined time period. The recomputed hash value is compared with the stored. If the stored hash value and the recomputed hash value are different, the method and system overwrite the stored hash value with the recomputed hash value, and generate a notification. Recomputing, comparing, overwriting and generating are performed periodically to monitor the changes in the defined area.

2 Claims, 3 Drawing Sheets

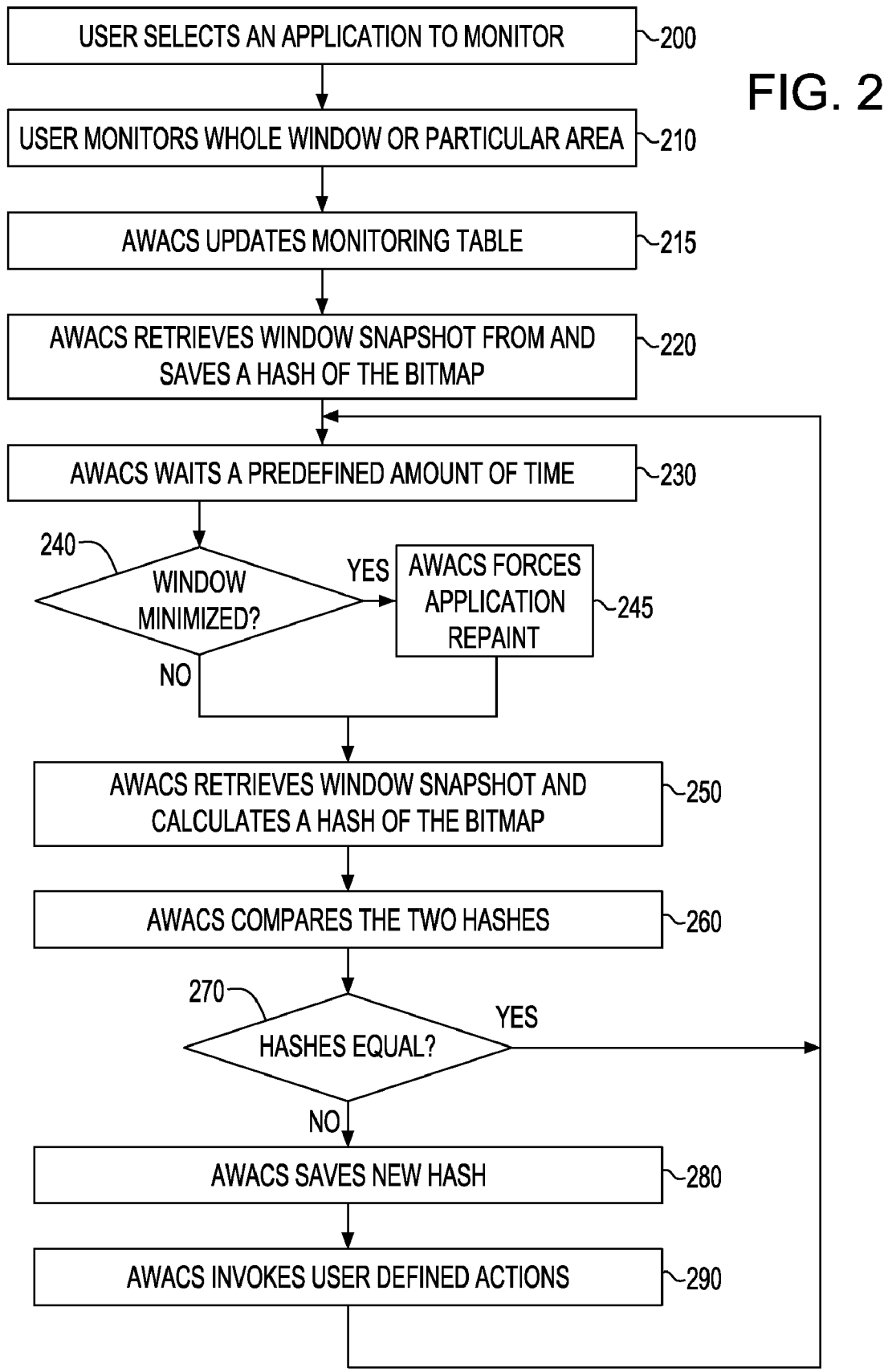

APPLICATION WINDOW AREA CHANGE SURVEILLANCE

FIELD OF THE INVENTION

The present application generally relates to computer systems, and more particularly, to monitoring changes in one or more computer window areas.

BACKGROUND OF THE INVENTION

Users can commonly access remote computers using different software like Virtual Network Computing (VNC) or Remote desktop Connection. They allow a user, for instance, an administrator to take control of the remote computer to perform some actions. Being able to display the remote computer screen is very useful to check the activities of that remote computer. If the user is waiting for an event involving a display modification, the window showing the remote computer must remain in the foreground for the user to be able to see the activities on that foreground window. If the window is hidden or overlapped by another application's window, or minimized, the display of that window is no longer visible and the result is that the user misses a modification or an event occurring on that window.

Video surveillance systems include motion detection and other features to recognize modification in the received video and detect a change based on a reference picture without human assistance. However, such software is in control of the incoming video flow, which is not the case with remote desktop kind of software. So, today, there is no way to define an area on any window and be notified when a change occurs in this specific zone even when the window is minimized or hidden by another window.

Desktop Window Manager (DWM, previously Desktop Compositing Engine or DCE) is a compositing window manager, introduced with Windows Vista™ operating system that enables the Windows Aero™ user interface. With DWM running, applications do not draw directly to the video memory, but to an off-screen buffers in system memory that are then composited together by DWM to render the final screen, a number of times per second. In that sense, it is similar to the Quartz compositor in Mac OS X™ or XGL™ based Composition Manager on Linux.

Because the compositor has access to the graphics of all applications, it easily allows effects that string together visuals from multiple applications, such as transparency. DWM uses DirectX to perform the function of compositing and rendering in the graphics processing unit (GPU), freeing the central processing unit (CPU) of the task of managing the rendering from the off-screen buffers to the display. However, it does not affect applications painting on the off-screen buffers; depending on the technologies used for that, it might still be CPU bound. DWM-agnostic rendering techniques like graphics device interface (GDI) are redirected to the buffers by rendering the user interface (UI) as bitmaps. DWM-aware rendering technologies like Windows Presentation Foundation (WPF) directly make the internal data structures available in a DWM-compatible format.

For rendering techniques that are not DWM-aware, output must be redirected to the DWM buffers. With Windows, either GDI or DirectX™ can be used for rendering. To make these two work with DWM, redirection techniques for both are provided with DWM. With GDI, which is the most used UI rendering technique in Microsoft Windows™, each application window is notified when it or a part of it comes in view and it is the job of the application to render itself. Without DWM, the rendering rasterizes the UI in a buffer in video memory, from where it is rendered to the screen. Under DWM, a buffer equal to the size of the window is allocated in system memory. GDI calls are redirected to write their outputs to this buffer, rather than the video memory. Another buffer is allocated in the video memory to represent the DirectX surface, which is used as the texture for the Window meshes. The system memory buffer is converted to the DirectX™ surface separately, and kept in sync. This roundabout route is required as GDI cannot output directly in DirectX™ pixel format. The surface is read by the compositor and composite the desktop in video memory. Writing the output of GDI to system memory is not hardware accelerated, nor is conversion to DirectX™ surface. When a GDI window is minimized, by limitations of GDI, the buffer is no longer updated. So, DWM uses the last bitmap rendered to the buffer before the application was minimized.

Web contents change rapidly. Users desire to receive notifications, instead of being forced to visit pages again and again. Commercial software (e.g., Copernic Agent™ meta search engine) or other browser add-ons allow users to track changes in web page contents. When a change is detected, alerts are sent to the user.

U.S. Pat. No. 6,981,225 discloses a computer accessible medium storing instructions to provide a graphical user interface for a browser application for a display of a processor-based system, said interface including a navigation bar with a selectable subtract button image and a window to display a web page; in response to an initial selection of said subtract button image, causing said browser application to difference a cached version and a current version of a Web page and display the difference between said versions in said window; and in response to subsequent selection of said subtract button image, toggle between the display of said current version and the display of the difference between said versions in said window. This approach has drawbacks since the comparison process and decision are not automatic. The user needs to intervene and decide in the end.

U.S. Pat. No. 5,978,828 discloses an apparatus and method of providing notification of a content change of a web page. The method includes the steps of transmitting a request from a first electronic system to a second electronic system for a quotient value indicative of the content change, transmitting the quotient value from the second electronic system to the first electronic system, comparing the quotient value to a predetermined value to determine whether a threshold is triggered, and notifying the first electronic system of the content change if the threshold is triggered. This patent detects changes in web pages addresses; it does not expose how to solve the technical problem of comparisons between web pages.

Similarly, many methods make use of strings of character comparisons, which may not be sufficient. All these methods target web uses and they do not apply to managing the kind of alerts for program windows of any type.

BRIEF SUMMARY OF THE INVENTION

A method and system for monitoring a computer program window are provided. The method in one aspect may comprise defining an area of a computer program window; computing a hash value for the defined area; storing the hash value; recomputing said hash value for the defined area after a predetermined time period; comparing the stored hash value with the recomputed hash value; overwriting the stored hash value with the recomputed hash value, if the stored hash value and the recomputed hash value are different; generating a notification if the stored hash value and the recomputed hash value are different; and repeating the steps of recomputing, comparing, overwriting, and generating periodically.

A system for monitoring a computer program window, in one aspect, may comprise a memory and a processor operable to define an area of a computer program window and to compute a hash value for the defined area, and store the hash value in the memory. The processor further recomputes the hash value for the defined area after a predetermined time period and compares the stored hash value with the recomputed hash value. The processor overwrites the stored hash value in the memory with the recomputed hash value, if the stored hash value and the recomputed hash value are different, and generates a notification.

A program storage device readable by a machine, tangibly embodying a program of instructions executable by the machine to perform above method may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a flow diagram illustrating a method of application window area change surveillance in one embodiment of the present disclosure.

DETAILED DESCRIPTION

The application window area change surveillance (AWACS) in one embodiment of the present disclosure provides a system and method to detect changes occurring in a reference area defined in any application window independently of the future window state. Future window state, for instance, refers to the window being sent to background, being minimized, etc. The system and method may notify the user by executing a set of defined actions. The system and method in one embodiment allow defining an area, for example, an application window area, and then being notified that something changed in the defined area independently of the state of that area.

In one embodiment of the present disclosure, an application is provided that is deployed on the operating system on the computer. Features of the application can be split into different functional areas.

Figure 1A:
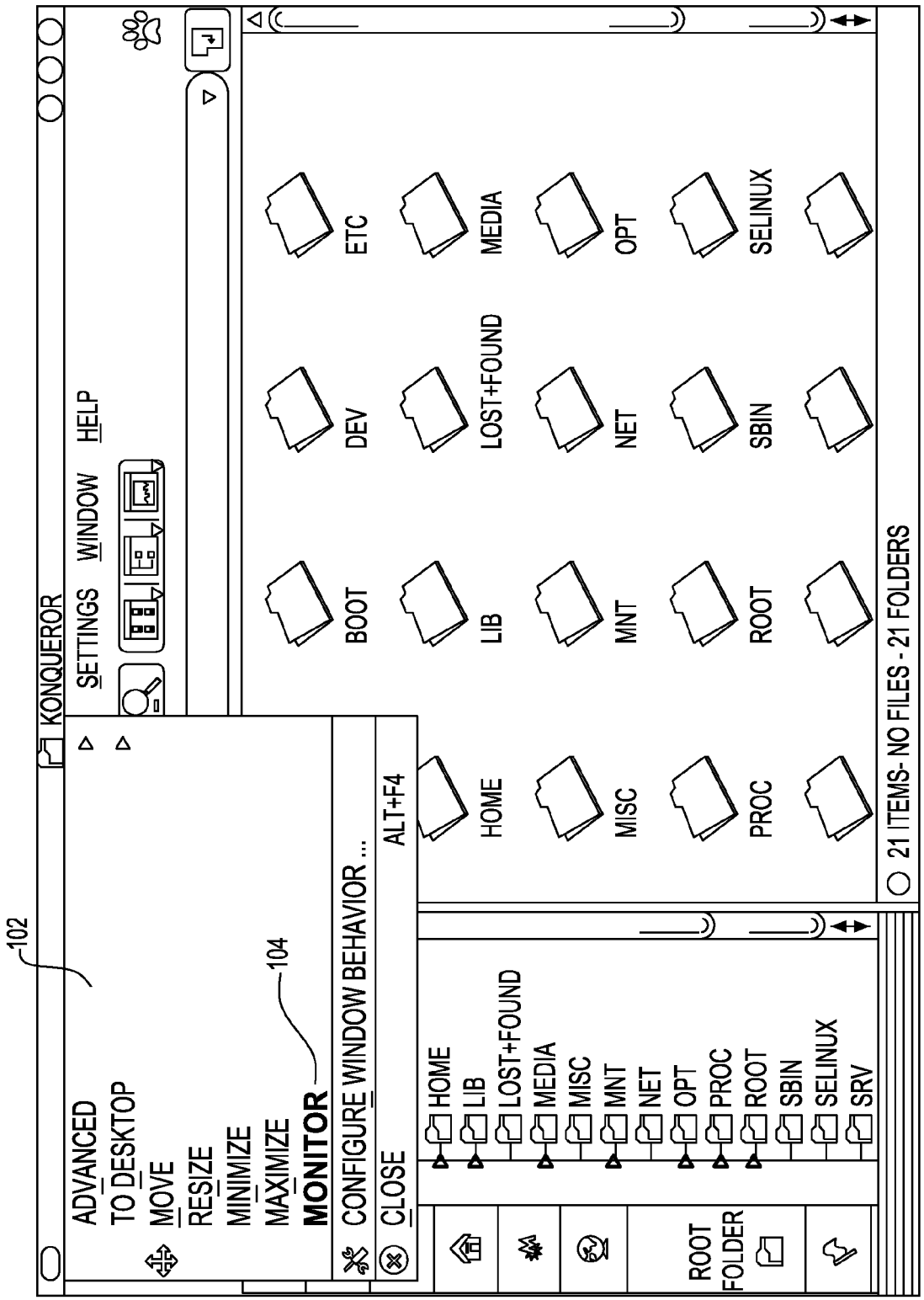
FIG. 1A shows a screen shot of a GUI that allows the user to select the window to be monitored by selecting an item that has been introduced in the window's drop-down menu.
Figure 1B:
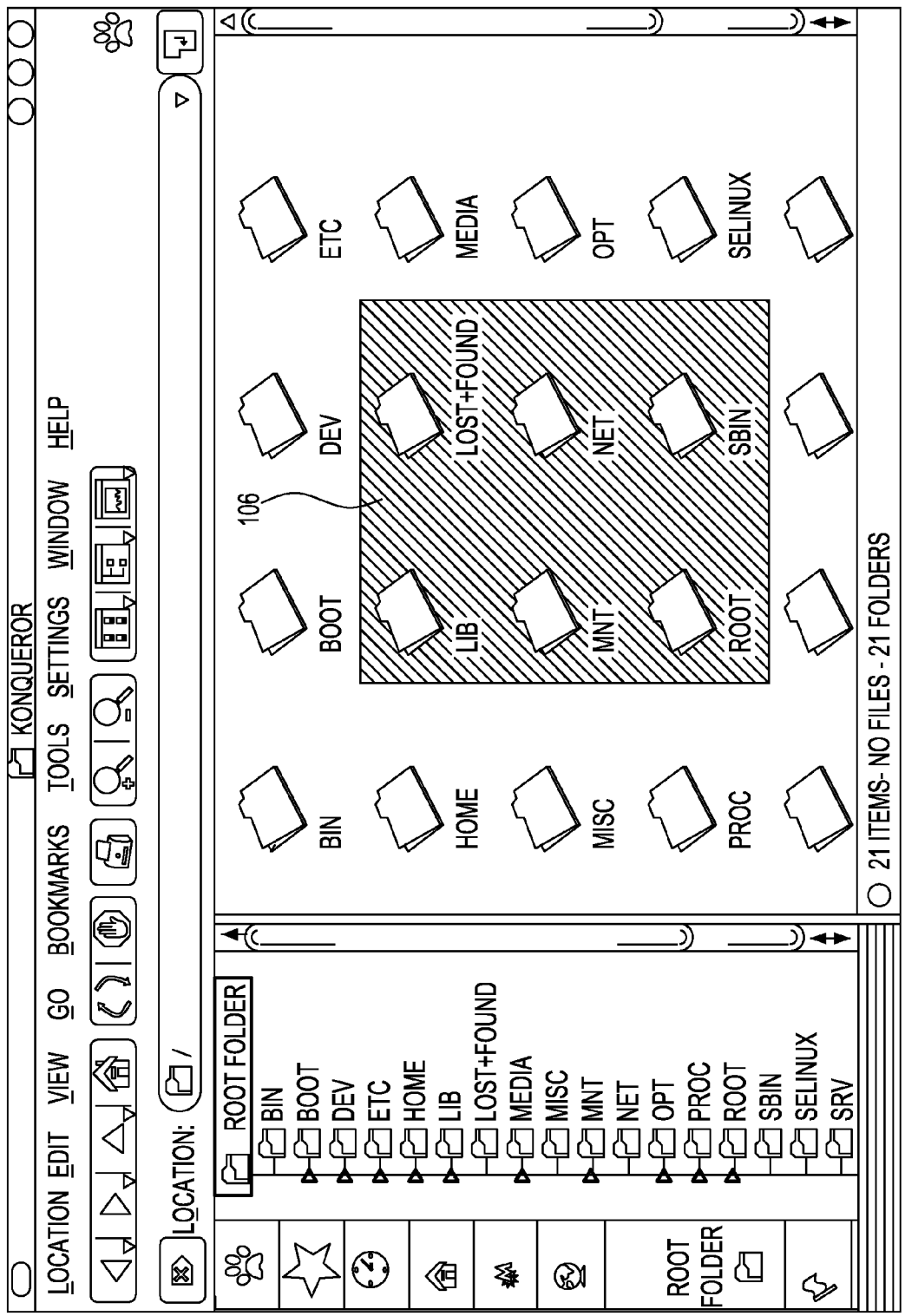
FIG. 1B illustrates a screen shot of a GUI that shows that the user can monitor the entire surface of the window or select a specific area.

In one aspect, the operating system's windowing environment is extended to enable the user to select an application window to be monitored by interacting with the window's context menu. For instance, AWACS may be implemented as a piece of software that includes a patched version of the operating system's windowing library. Window's context menu may be a drop-down menu that a graphical user window has and that offers items like minimize, maximize, close, etc. FIG. 1A shows an example of a context menu 102. When the application has been selected, either the full window or a particular area can be marked for monitoring. The selection of a particular area is performed by drawing a rectangle in overlay on the application's window. For instance, after the user has selected the "Monitor" item 104 in the window context menu 102, the behavior of the mouse pointer changes, for example, to that of a drawing tool, and enables the user to draw a partially transparent rectangular area over the window. When the mouse button is released, the coordinates of the rectangular area, relative to the window, are fed into the system. This extension may also provide a dialog for the user to select one or more operation to be accomplished when a change is detected in the desired area. The information, for example, the selected area to be monitored, the one or more operations to perform upon detection of changes in the selected area, etc. is collected and stored in a monitoring table. FIG. 1B illustrates an area 106 selected for monitoring.

A "monitoring table" is maintained, in one embodiment, in memory to store information on the application windows to monitor. The information maintained in the monitoring table may include but are limited to, window identifier (ID), a hash calculated on the bitmap of the window area to monitor, horizontal and vertical coordinates of the area to monitor, for instance, relative to the application window, and a list of actions to perform when a change is detected. The information listed herein is not meant to limit the type of information that can be maintained, but is given only as examples.

A daemon running in the background may check or periodically look in the monitoring table for application windows to monitor. A daemon is a background process that runs continuously in the background, and typically started up automatically when the computer system is booted up on started, and runs until the computer system is shut down. Alternatively, the daemon can be started and stopped manually. For each application windows to monitor, the daemon process may access the application's off screen video buffer, calculate a hash on the monitored window area bitmap and if available, compare it with the previously calculated hash available in the monitoring table. The daemon process may be a remote monitoring tool that is run over a computer network.

If the hashes do not match, this means that a change in the window area has occurred and therefore the daemon may execute the actions associated with this monitoring table entry, for instance, as defined by the user and update the hash in the monitoring table.

In one aspect, a threshold value may be set for determining whether there is a change to the window area being monitored. For instance, rather than comparing the hash values of the entire area, a pixel by pixel comparison may be performed and depending on how many or what percentage of the pixels match, a decision can be made as to whether the window area has changed or not. This feature would allow minor changes to be filtered out as not being changes at all. In yet another aspect, a level of changes may be set for, for example, minor, standard, major, depending on the number or percentage of changes detected.

If the application window is minimized, the daemon process may bypass the normal operating system's windowing environment behavior, which would not normally update the window content, and control the application to repaint its content to its off-screen buffer.

FIG. 2 is a flow diagram illustrating a method of application window area change surveillance in one embodiment of the present disclosure. At step 200, the user selects the window to be monitored by selecting an item that has been introduced by AWACS in the window's drop-down menu. FIG. 1A illustrates an example of a window's drop-down menu in one embodiment. A "monitor" menu item is provided that can be selected by a user and which upon selection triggers or initiates the monitoring functionality of the present disclosure in one embodiment.

Referring to FIG. 2, at step 210, the user is enabled to monitor the entire surface of the window or select a specific area. The selected area or image may be further divided into a plurality of sub-images, and each sub-image may be monitored individually. FIG. 1B shows an example of a GUI via which the user can monitor the area of the window. As described above, for example, after the user has selected the "Monitor" item in the window context menu, the behavior of the mouse pointer changes and enables the user to draw a partially transparent rectangular area over the window. When the mouse button is released, the coordinates of the rectangular area, relative to the window, are fed into the system. Any other method or tools may be provided that allow the user to select or indicate an area for monitoring.

Referring to FIG. 2, at step 215, based on the user selection, AWACS updates the Monitoring Table, for example, shown in Table 1, with information about the window to monitor, the dimension of the area in the window that should be monitored, and a list of actions the user wants to execute when a change is detected. Such actions may include, for example, popup, bring the window to front, play a sound, launch an arbitrary, etc. command, etc.

AT step 220, AWACS asks the operating system's composition manager or like to provide a snapshot bitmap of the window content. Composition manager of an operating system, for instance, refers to the component of the operating system in charge of compositing the user interface. It constructs the image visible by the user based on the windows overlapping, precedence and so forth. In one embodiment, WACS may crop the bitmap, if needed, to the user-defined area and calculates a hash of the resulting bitmap. Algorithms like CRC32, SHA1 or MD5 or other algorithms could be used to create a hash of the bitmap. This hash is stored in the Monitoring Table in the row associated with that particular window ID.

At step 230. AWACS waits a configurable amount of time before fetching a new snapshot. This amount of time may be predetermine period, for example, and may depend on the frequency of changes, and may range from a few milliseconds to several hours as an example. The duration of time may also be set by a user or administrator and appropriate.

At step 240/245, when a window is in minimized mode, the operating system generally does not ask the application to repaint its content. Therefore, if the window monitored by AWACS is found to be in minimized mode, AWACS will bypass the operating system's window manager and force the application to render its content to its associated off-screen buffer. This may be deployed in the form of a patch to the operating systems libraries. The code that normally skips the repainting of a window's content when it is minimized is modified to take into account that the window may be under AWACS monitoring; in which case it will be asked to repaint itself to the offscreen buffer despite the minimized state.

At step 250, AWACS asks the operating system's composition manager to provide a snapshot bitmap of the window content. If needed, for example, AWACS crops the bitmap to the user-defined area and calculates a hash of the resulting bitmap.

At step 260, AWACS compares the freshly computed hash at step 250 with the one store in the Monitoring Table.

At step 270, if the two hashes are equal, AWACS concludes that the window content has not changed and loops back to the waiting phase.

At step 280, if the two hashes are different, AWACS concludes that the window content has been altered and saves the recently computed hash (at step 250) in the Monitoring Table as it represents the newest state of the window At step 290, AWACS invokes the list of user-defined actions to respond to the window content change according to the user's preferences stored in the Monitoring Table before resuming the monitoring.

In one embodiment, the monitoring table is maintained in memory by AWACS and keeps track of the identifiers of the windows being monitored, with their monitoring zone coordinates, the last hash that was calculated for that zone and the actions the user wants to invoke when a change is detected.

TABLE 1

| Window ID | Bitmap Hash | X1 | Y1 | X2 | Y2 | User defined action list |
|---|---|---|---|---|---|---|
| 0x2c00043 | cc81c727735749fe1111e1905b3bfb37 | 0 | 0 | 1398 | 984 | Popup/Exec |
| 0xa00043 | 0493d2b933213de9f72fccac4ab6fd36 | 325 | 234 | 500 | 400 | Bring-To-Front |
| ... | | | | | | |
| ... | | | | | | |

Table 1, for example, includes window ID "0x2c00043" with bitmap hash of "cc81c727735749fe1111e 1905b3btb37." X1, Y1 represent the location coordinates for the top-left corner of the window area, and X2, Y2 represent the location coordinates for the bottom-right corner of the window area. Other location configuration or coordinates may be contemplated. For instance, the area need not be rectangular and may include coordinates that specify a circular area of area of other shapes. User defined action list represent one or more actions that the user desires the application to perform after detecting a change in the monitored area.

Storing information as shown in Table 1 allows for monitoring a plurality of areas at the same time, for instance, each defined area being identified by a unique identifier (e.g., Window ID).

A system for monitoring a computer program window may include a general purpose computer processor, a memory such as RAM, a disk storage or like, a display monitor connected to the processor, an input device connected to the processor for allowing a user to manipulate input and output to the computer. A display manager module may include a GUI module and interact with the user and take input such as the area of the screen to be defined and monitored, actions to perform upon detection of the changes in the area of the screen being monitored. The processor may include a hash computing unit or module for computing hash, and storing the computed hash in memory or like. The system may also include a module such as a daemon process module that runs on the processor as a background process and periodically monitors the defined area. The display manager module may provide further display management functionalities and provide notification to the user when the daemon process detects changes in the monitored area.

The system and method of the present disclosure may be run to apply to a mobile environment in addition to standard desk top environment. For instance, the monitored window area may be of a mobile device such as a telephone, blackberry, personal digital assistants (PDA), or like.

Yet in another aspect, the AWACS of the present disclosure may run in conjunction with applications such as ad blockers so that an ad pop up is recognized as such and not as a change in the monitored area. Such capacity avoids false positive since flashy banners may trigger unnecessary alerts. Further yet, the AWACS may connect to optical character recognition (OCR) systems and image recognition technologies to refine alerts to notifications. For instance, once a change is detected, the AWACS may further intelligently detect the content of the changes.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for monitoring a computer program window, comprising:
    defining an area of a computer program window;
    computing a hash value for the defined area;
    storing the hash value;
    recomputing said hash value for the defined area after a predetermined time period;
    comparing the stored hash value with the recomputed hash value;
    overwriting the stored hash value with the recomputed hash value, if the stored hash value and the recomputed hash value are different;
    generating a notification if the stored hash value and the recomputed hash value are different, the notification signaling a change in the area of the computer program window;
    determining whether the area of the computer program window has been minimized, and in response to determining that the area of the computer program window has been minimized, controlling an application associated with the area of the computer program window to repaint its content to an off-screen buffer; and
    repeating the steps of recomputing, comparing, overwriting, and generating, and determining periodically;
    wherein the step of generating a notification includes executing a selected action;
    wherein the method further including allowing a user to specify the selection action and storing said selected action and providing a graphical user interface for allowing a user to select the area of a computer program window and identify the selected action to execute, wherein the method is performed for a plurality of areas at the same time, and each area defined is identified by a unique identifier.

2. A system for monitoring a computer program window, comprising:
    a memory;
    a processor operable to define an area of a computer program window and to compute a hash value for the defined area, and store the hash value in the memory, the processor further operable to recompute said hash value for the defined area after a predetermined time period and compare the stored hash value with the recomputed hash value, said processor further operable to overwrite the stored hash value in the memory with the recomputed hash value, if the stored hash value and the recomputed hash value are different, said processor generating a notification if the stored hash value and the recomputed hash value are different, the processor further operable to determine whether the area of the computer program window has been minimized, and in response to determining that the area of the computer program window has been minimized, the processor operable to control an application associated with the area of the computer program window to repaint its content to an off-screen buffer, the processor operable to repeat the recomputing, comparing, overwriting, generating, and determining periodically to detect changes in the defined area, wherein the generating a notification includes executing a selected action in response to detecting the changes;
    a computer-implemented graphical user interface operable to allow a user to select the area of a computer program window and identify the selected action to execute, and wherein the processor is operable to define a plurality of areas for monitoring, and each area defined is identified by a unique identifier.

* * * * *